(12) United States Patent
    Zharichenko (10) Patent No.: US 9,643,534 B1
(45) Date of Patent: May 9, 2017

(54) METHOD OF MODULATING A VEHICLE'S BRAKE LIGHT ACTIVATION BY EXECUTING COMPUTER-EXECUTABLE INSTRUCTIONS STORED ON A NON-TRANSITORY COMPUTER-READABLE MEDIUM

(71) Applicant: Slava Zharichenko, Mechanicsburg, PA (US)

(72) Inventor: Slava Zharichenko, Mechanicsburg, PA (US)

( * ) Notice: Subject to any disclaimer, the term of this patent is extended or adjusted under 35 U.S.C. 154(b) by 0 days.

(21) Appl. No.: 15/145,419

(22) Filed: May 3, 2016

(51) Int. Cl.
    *B60Q 1/44*    (2006.01)
(52) U.S. Cl.
    CPC .................................... *B60Q 1/447* (2013.01)
(58) Field of Classification Search
    None
    See application file for complete search history.

(56) References Cited

U.S. PATENT DOCUMENTS

| | | | | |
|---|---|---|---|---|
| 5,345,218 A * | 9/1994 | Woods | ..................... | B60Q 1/44 340/464 |
| 2001/0054957 A1* | 12/2001 | Cohen | ..................... | B60Q 1/444 340/479 |
| 2002/0133282 A1* | 9/2002 | Ryan | ..................... | B60Q 1/444 701/70 |
| 2008/0111673 A1* | 5/2008 | Roberts | ................ | B60Q 1/2657 340/479 |
| 2008/0309478 A1* | 12/2008 | Morales | ................ | B60Q 1/444 340/467 |
| 2015/0360603 A1* | 12/2015 | Miner | ..................... | B60Q 1/44 340/479 |

* cited by examiner

*Primary Examiner* — Adolf Dsouza (57) ABSTRACT

A method of modulating a vehicle's brake light activation causes the vehicle's brake light to flash on and off according to a specified modulation sequence during brake activation. Modulation of the brake light during a subsequent brake activation during a timeout duration after the initial brake activation. The modulation sequence may be modified through user input, continual brake activation, and braking force detected.

9 Claims, 9 Drawing Sheets

METHOD OF MODULATING A VEHICLE'S BRAKE LIGHT ACTIVATION BY EXECUTING COMPUTER-EXECUTABLE INSTRUCTIONS STORED ON A NON-TRANSITORY COMPUTER-READABLE MEDIUM

FIELD OF THE INVENTION

The present invention relates generally to vehicles. More particularly, the present invention relates to modulating vehicle brake lights.

BACKGROUND OF THE INVENTION

The lighting system of a motor vehicle consists of lighting and signaling devices mounted or integrated to the front, rear, sides and in some cases the top of a motor vehicle. This lights the roadway for the driver and increases the conspicuity of the vehicle, allowing other drivers and pedestrians to observe a vehicle's presence, position, size, direction of travel, and the driver's intentions regarding direction and speed of travel.

Every road-legal vehicle is required to have functioning brake lights that are activated when the driver applies the vehicle's brakes. This is important because it warns trailing drivers of the forward vehicle's deceleration, giving them a chance to do the same and avoid a rear-end collision.

Currently, vehicle brake lights are illuminated in a steady, static fashion. However, it has long been known that intermittently flashing or pulsating lights attract more attention than continuously illuminated lights. Thus, making the brake light automatically flash would provide a more effective method of warning of a slowing down or stopping vehicle. It is therefore an object of the present invention to provide a method for modulating a vehicle's brake light activation in order to enhance the attention drawn by the brake light, while also modifying the modulation in short-term subsequent brake activations to reduce potential annoyance during conditions of heavy traffic.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced without the implementation of some features as they are described. It should be understood that some details have not been described in detail in order to not unnecessarily obscure focus of the invention.

Figure 1:
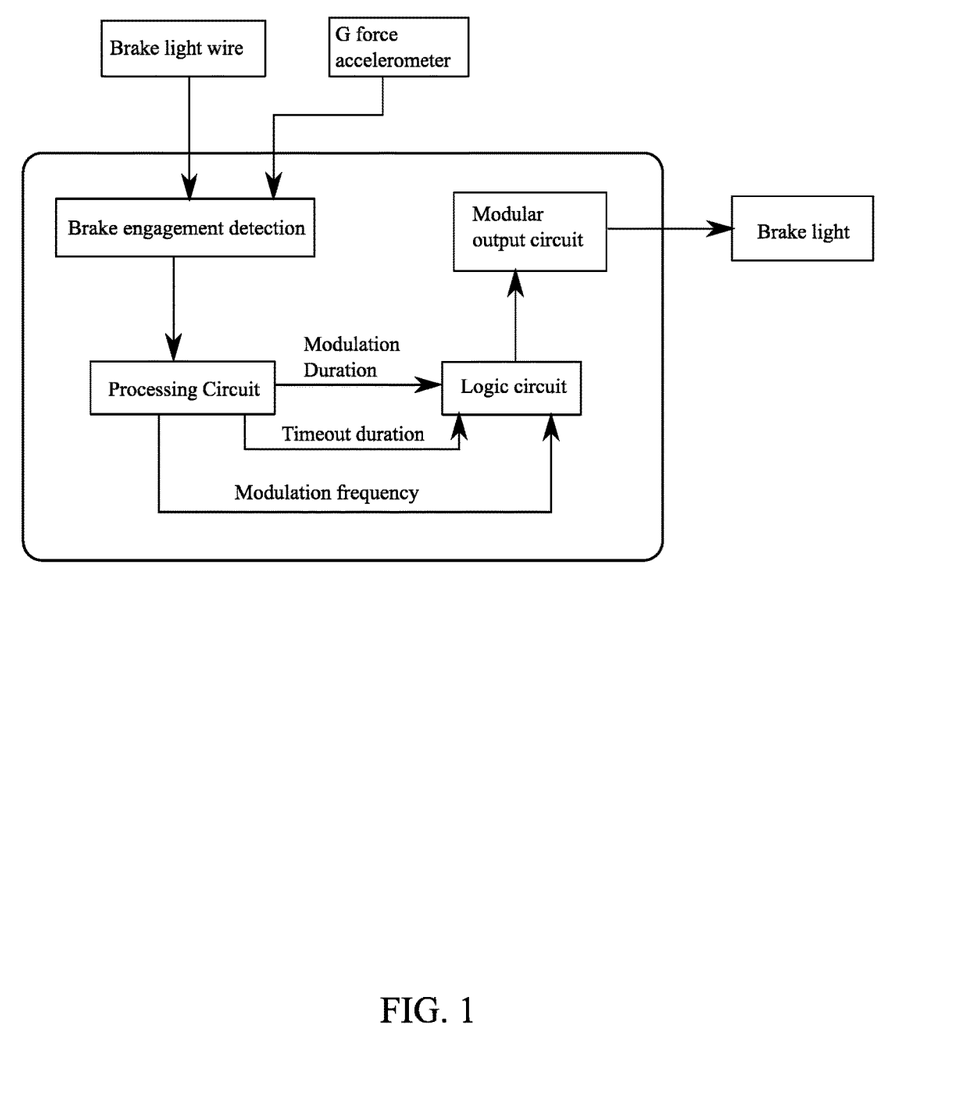
FIG. 1 is a general diagram of the functionality and circuitry of one embodiment of the present invention.

The present invention is a method of modulating a vehicle's brake light activation based on the recent history and frequency of activation of the vehicle's brakes. It has long been known that intermittently flashing or pulsating lights attract more attention than lights that continuously produce light. Thus, making the brake light automatically flash would provide a more effective method of warning of a decelerating or stopping vehicle. The present invention provides the ability to select from a range of modulating frequencies to properly match the type of light bulb installed in the brake light housing of the vehicle. FIG. 1 shows a general diagram of one embodiment of how the present invention works.

In the preferred embodiment of the present invention, the method of the present invention is carried out through a control system connected to the vehicle's Central High Mount Stop Light (CMHSL), or through the brake light of a motorcycle, depending on specific implementation. In other embodiments, any brake light or other light of a vehicle may be modulated according to the method of the present invention as desired or applicable.

The present invention is formulated to enhance braking display indication by modulating a brake light when brakes are applied by the operator of the vehicle or the vehicle's automatic braking system, where applicable. In one embodiment, a flasher module control system is installed into an existing vehicle as an add-on component. In other embodiments, the logic and required control systems and circuits are integrally installed into the vehicle during manufacture.

In general, in one embodiment, brake light modulating frequency and quantity of the modulation are derived from configurations set by the end user. Initial brake application creates a brake light modulation effect. After the brakes are released, subsequent modulation of the light is disabled for the consecutive brake applications. The light will come on solid with the consecutive brake applications. The disabled period duration time is calculated by the flasher device internal logic. The lockout time period depends on the number of the brake applications in a specified period of time elapsed and calculated by the logic build into the flasher controller circuitry. The lockout time (modulation disabled time period) helps to avoid re-modulation of the light during stop and go traffic where the brakes are frequently reapplied. To further reduce annoyance of brake light modulation during the stop and go traffic, the light modulation cycles are also reduced from the initial configuration set by the end user.

Figure 2:
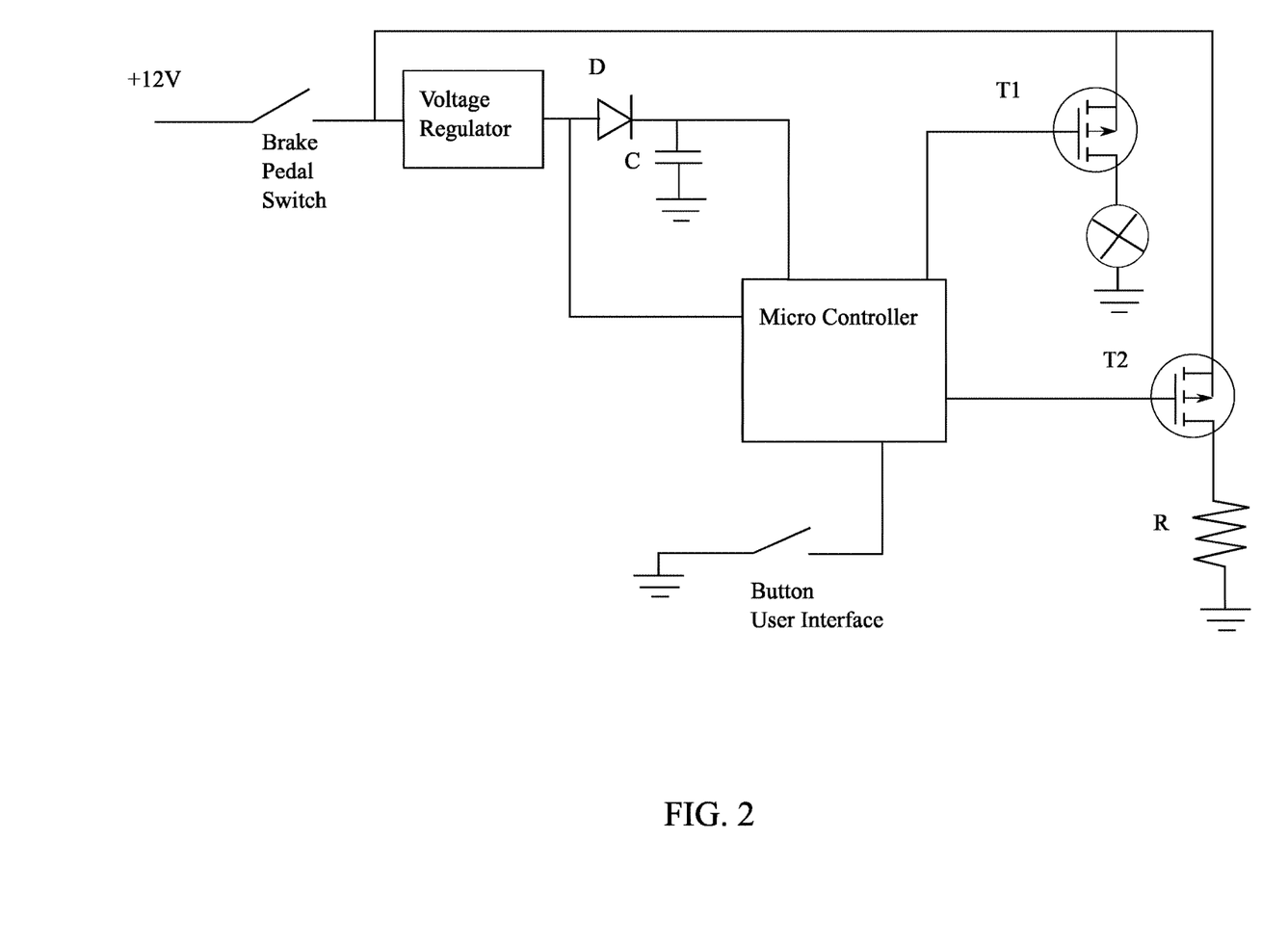
FIG. 2 is a circuit diagram of one embodiment of the present invention.

In one embodiment, the physical unit which facilitates the method of the present invention is expected to be installed in the CHMSL housing, creating a current interruption path between the vehicle's brake switch and the brake light. The flasher unit may comprise any useful, required, or otherwise applicable components, electronic and otherwise, in order to facilitate the spirit of the present invention. More specifically, in one embodiment, the flasher unit comprises a voltage regulator to supply appropriate voltage to the control components, an all-in, multipurpose microcontroller unit which includes an input interface, a calculation unit and pulse modulation width (PMW) output circuitry, and a MOSFET transistor high current output component to control the current flow between the power supply and the brake light. The flasher unit preferably further comprises an additional load circuit for avoiding any fault codes generated by any vehicle monitoring systems, if they are present, and additionally a power capacitor with a flow back prevention diode to provide power to the flasher circuitry during any non-braking periods while power is not being supplied to the unit. FIG. 2 shows one embodiment of an electronic circuit which can be utilized to facilitate the present invention.

It should be understood that any suitable processing units, such as, but not limited to, said multipurpose microcontroller unit, other types of microprocessors, and other types of processing units may be utilized to execute the various computer-executable instructions necessary to facilitate the method of the present invention. For example, it may be possible to connect an external processing unit, such as a personal computer, laptop computer or mobile device such as a cell phone or tablet to the computing system or electronic circuitry of the vehicle in order to facilitate the present invention.

Figure 3:
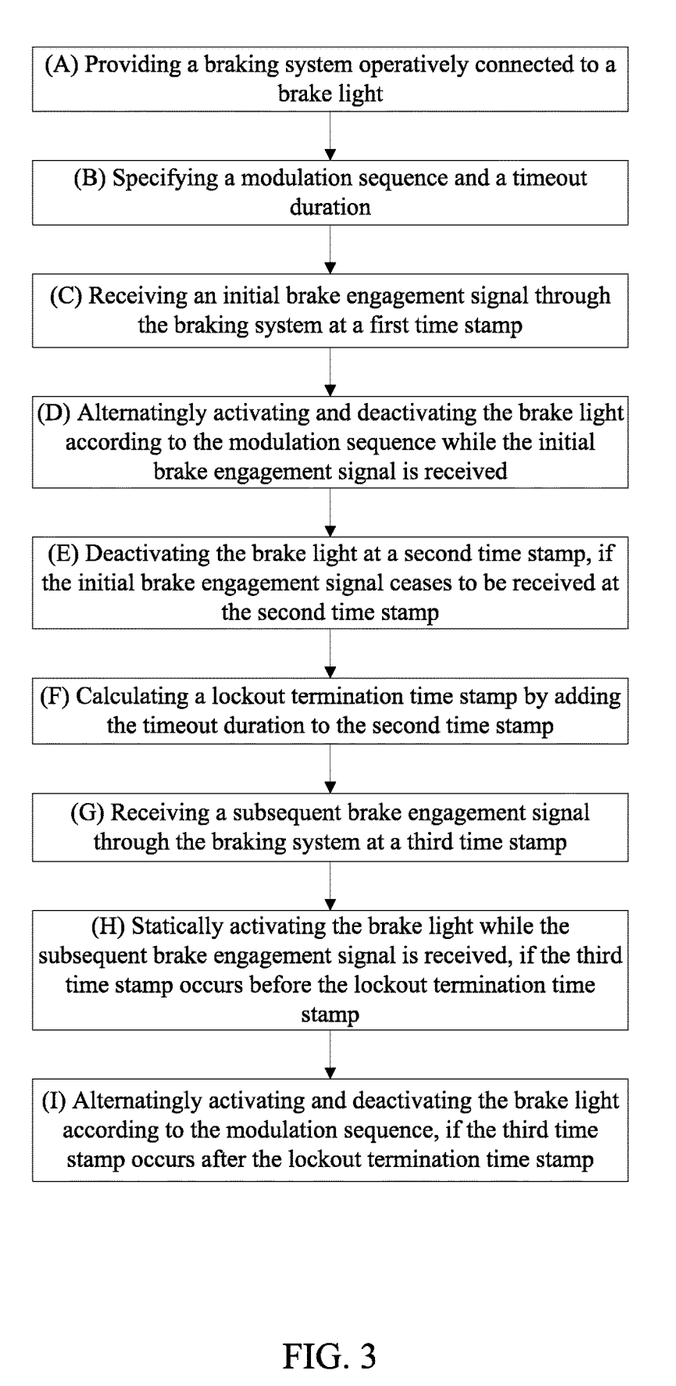
FIG. 3 is a stepwise flow diagram showing the general process of the present invention.

Referring to FIG. 3, in the general method of the present invention, a braking system is provided, being operatively connected to a brake light through the aforementioned system and circuitry or any other applicable and useful arrangement of electronic circuitry or other components.

Figure 6:
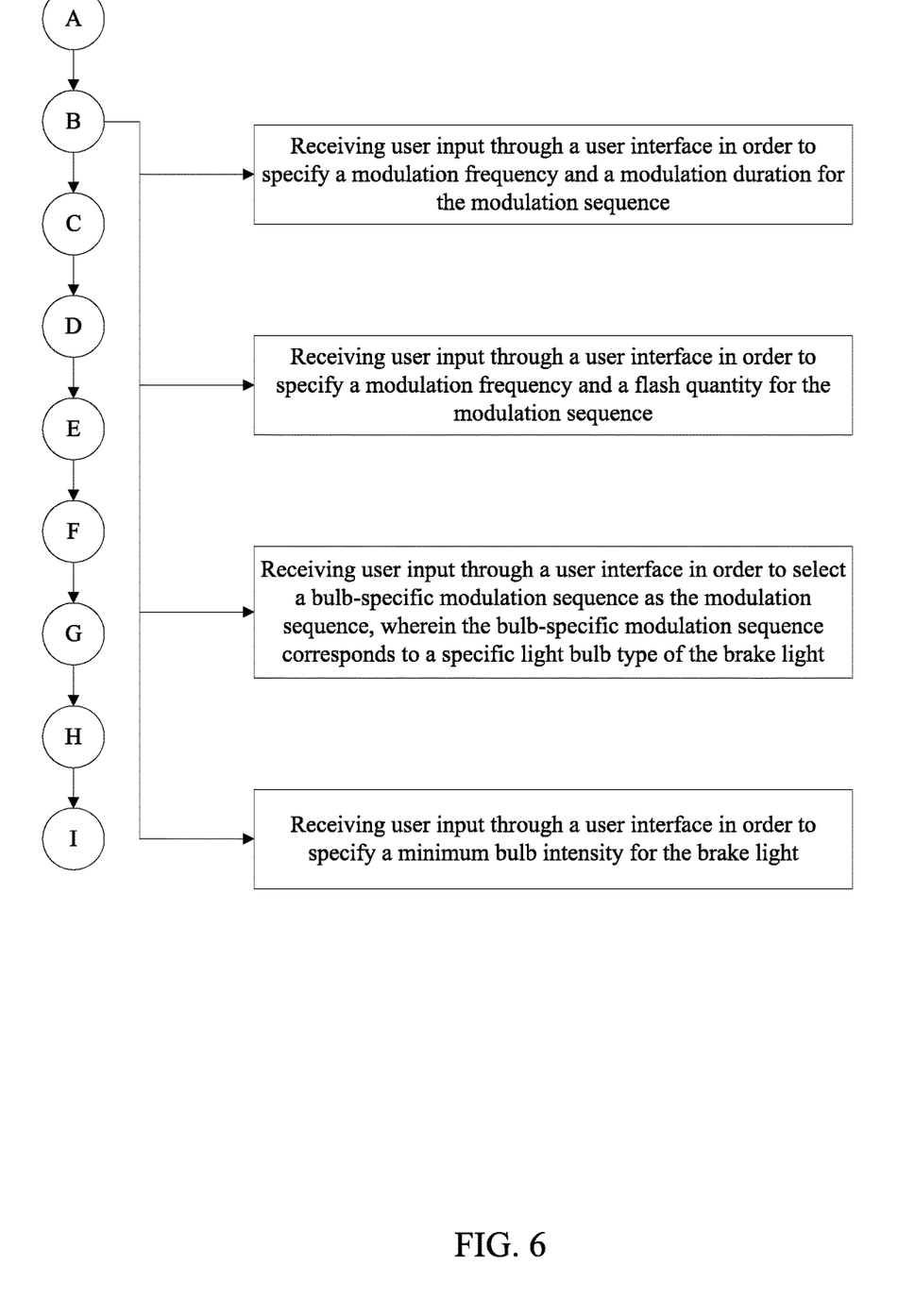
FIG. 6 is a stepwise flow diagram showing steps for specifying the modulation sequence.

A modulation sequence and a timeout duration are then specified. In practice, the unit may be provided with default settings for the modulation sequence and the timeout duration, or the user must specify the modulation sequence and the timeout duration before the present invention can be utilized. Referring to FIG. 6, in one embodiment, user input is received through a user interface in order to specify a modulation frequency and a modulation duration for the modulation sequence. In one embodiment, user input is received through the user interface in order to specify a modulation frequency and a flash quantity for the modulation sequence.

In one embodiment, the user interface is a single push button for input and a light source that can flash for feedback. In other embodiments, any other suitable user interfaces may be utilized, including, but not limited to, a graphical user interface (GUI) such as a digital screen and keyboard or a touchscreen, one or more switched, a device such as the aforementioned laptop computer, smartphone or tablet, or any other type of user interface.

After the flasher unit is installed in the vehicle and the modulation sequence and the timeout duration are specified, the system is initialized and ready for use while operating the vehicle. Thus, an initial brake engagement signal is received at a first time stamp by the processing unit when the operator of the vehicle presses on the vehicle's brake pedal, or if an automatic braking system of the vehicle is activated, or if the braking system is engaged by other means. The brake light is then alternatingly activated and deactivated according to the modulation sequence while the brake engagement signal is received. In other words, while the braking system is engaged, the brake light will flash according to the modulation frequency and modulation duration or flash quantity as initially specified by the user or by default.

It should be noted that references to time stamps herein should not be considered to be limiting to the functionality of the present invention, and are simply one means of means of measuring time intervals. Other means of describing differences in time may alternatively be utilized as desired or relevant.

Once the braking system ceases to be engaged at a second time stamp, the initial brake engagement signal ceases to be received by the processing unit at the second time stamp, and the brake light is deactivated at the second time stamp. A lockout termination time stamp is then calculated by adding the timeout duration to the second time stamp.

Figure 4:
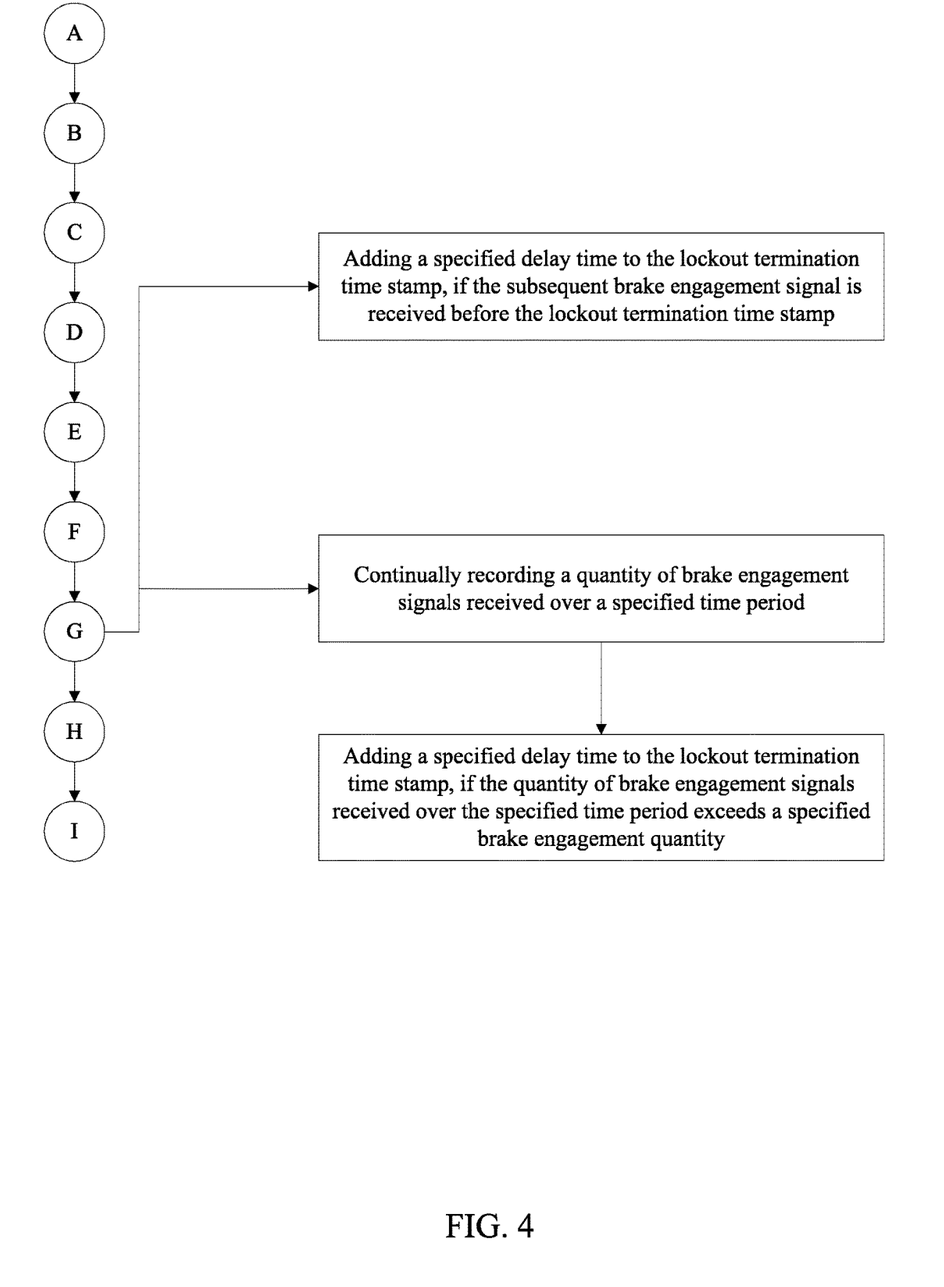
FIG. 4 is a stepwise flow diagram showing steps for modifying the lockout termination time stamp.

Since one main goal of the present invention is to avoid irritation or annoyance to other drivers in heavy traffic due to frequent brake use, a subsequent brake engagement signal received through the braking system at a third time stamp must be considered. If the third time stamp occurs before the lockout termination time stamp, the brake light is statically activated as opposed to flashing the brake light according to the modulation sequence. Additionally, a specified delay time is added to the lockout termination time stamp if the subsequent brake engagement signal is received at the third time stamp before the lockout termination time stamp, as described in FIG. 4. Alternatively, if the third time stamp occurs after the lockout termination time stamp, the brake light is again alternatively activated and deactivated according to the modulation sequence.

Thus, after a first brake activation, during which the brake light is flashed according to the modulation sequence, if the braking system is activated again before the timeout duration, the brake light is activated statically and not flashed, and the timeout duration is extended. If the braking system is activated again after the timeout duration expires, the brake light is flashed similarly to the original brake activation.

Various features of the present invention provide additional benefit to the present invention. In one embodiment described in FIG. 4, the timeout duration is increased in proportion to the frequency of brake engagement. To this end, a quantity of brake engagement signals received over a specified time period are continually recorded, and a specified delay time is added to the lockout termination time stamp if the quantity of brake engagement signals received over the specified time period exceeds a specified brake engagement quantity.

Figure 5:
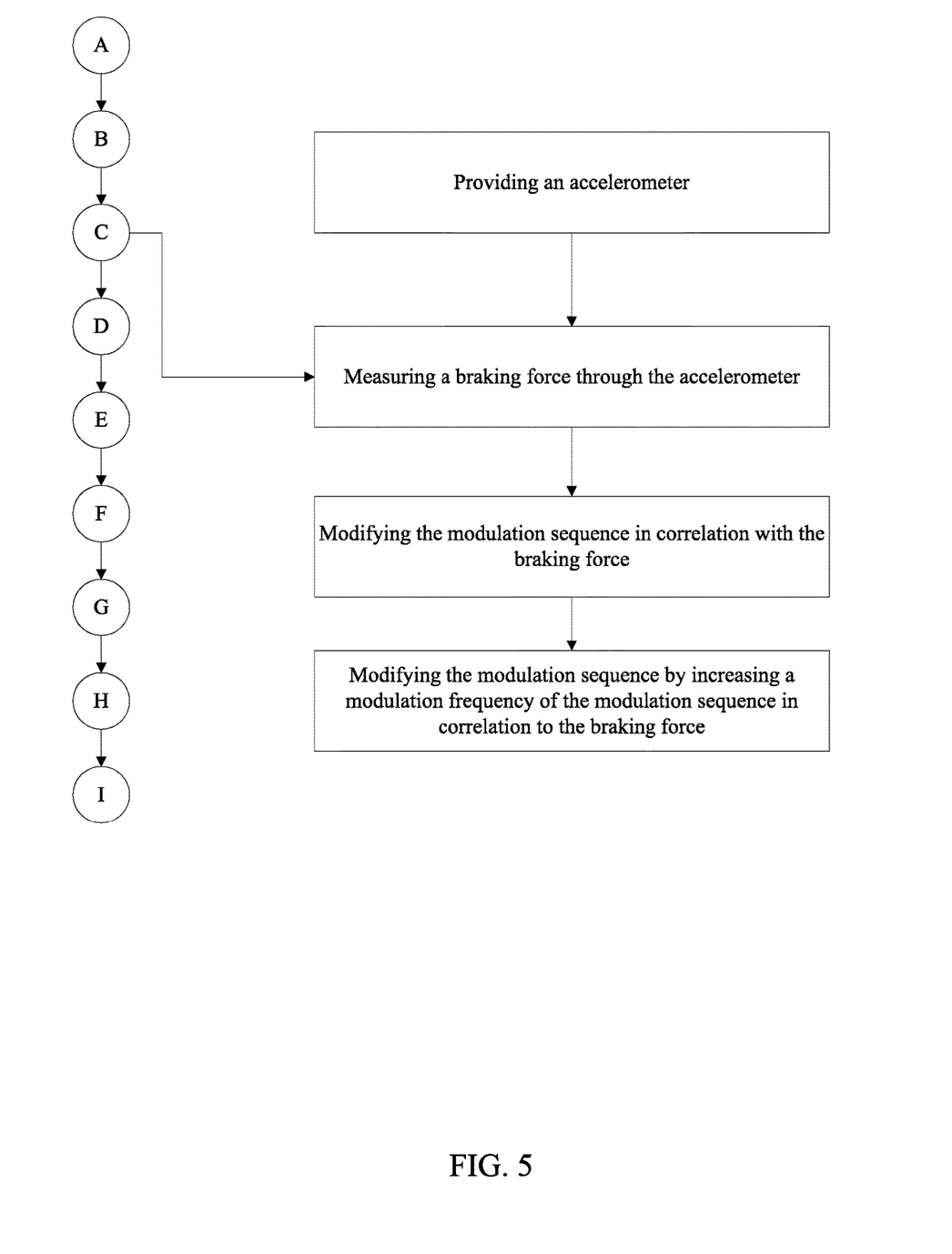
FIG. 5 is a stepwise flow diagram showing steps for modifying the modulation sequence using an accelerometer.

In various embodiments, the modulation sequence may be modified through various means. One feature of the present invention is to flash the brake light in correlation with how hard the vehicle is braking. Referring to FIG. 5, to this end, an accelerometer is additionally provided in the vehicle in any relevant location, and is electrically or electronically connected to the braking system, the processing unit or any relevant component of the system which facilitates the use of the accelerometer in conjunction with the functionality of the present invention. A braking force is measured through the accelerometer; more particularly, an acceleration value is measured through the accelerometer, and upon braking when the acceleration value is negative, the acceleration value is utilized by the present invention. The modulation sequence is modified in correlation with the braking force. In one embodiment, the correlation of the modification of the modulation sequence and the braking force is linear. In other embodiments, the correlation is exponential, or the correlation may be defined according to any desired curve. In one embodiment, the modulation sequence is modified by increasing the modulation frequency of the modulation sequence in correlation to the braking force. As such, larger deceleration (negative acceleration) is correlated with faster flashing of the brake light.

Currently most vehicles brake lights utilize either light emitting diode (LED) or incandescent bulbs. Incandescent bulbs tend to illuminate the light for a period of time even when the power is completely removed due to the storage of energy in the bulb's filament, making generation of visible high frequently modulation problematic. LED bulbs, on the other hand, are very dynamic and stop illuminating the light upon removal of the supplied current instantaneously to the human eye. One embodiment of the present invention provides the ability to adapt the modulation sequence for different types of light bulb types. The present invention resolving the issue by making the modulation frequency adjustable by the end user upon installation by selecting a range of modulating frequencies to properly match type of the brake bulb, where the lower frequency will be selected for incandescent bulb to let it 'cool' during the off period, and higher frequency for LED or other bulb types with instantaneous light up and down times.

Referring to FIG. 6, in one embodiment, the user may select from a plurality of modulation sequences to ensure proper function of the present invention depending on the type of light bulb installed into the brake light. Thus, user input may be received through the user interface in order to select a bulb-specific modulation sequence as the modulation sequence. The bulb-specific modulation sequence corresponds to a specific light bulb type of the brake light. Additionally, user input may be received through the user interface in order to specify a minimum bulb intensity for the brake light. The minimum bulb intensity may be specified for during the modulation sequence to accommodate different light bulb types.

Figure 7:
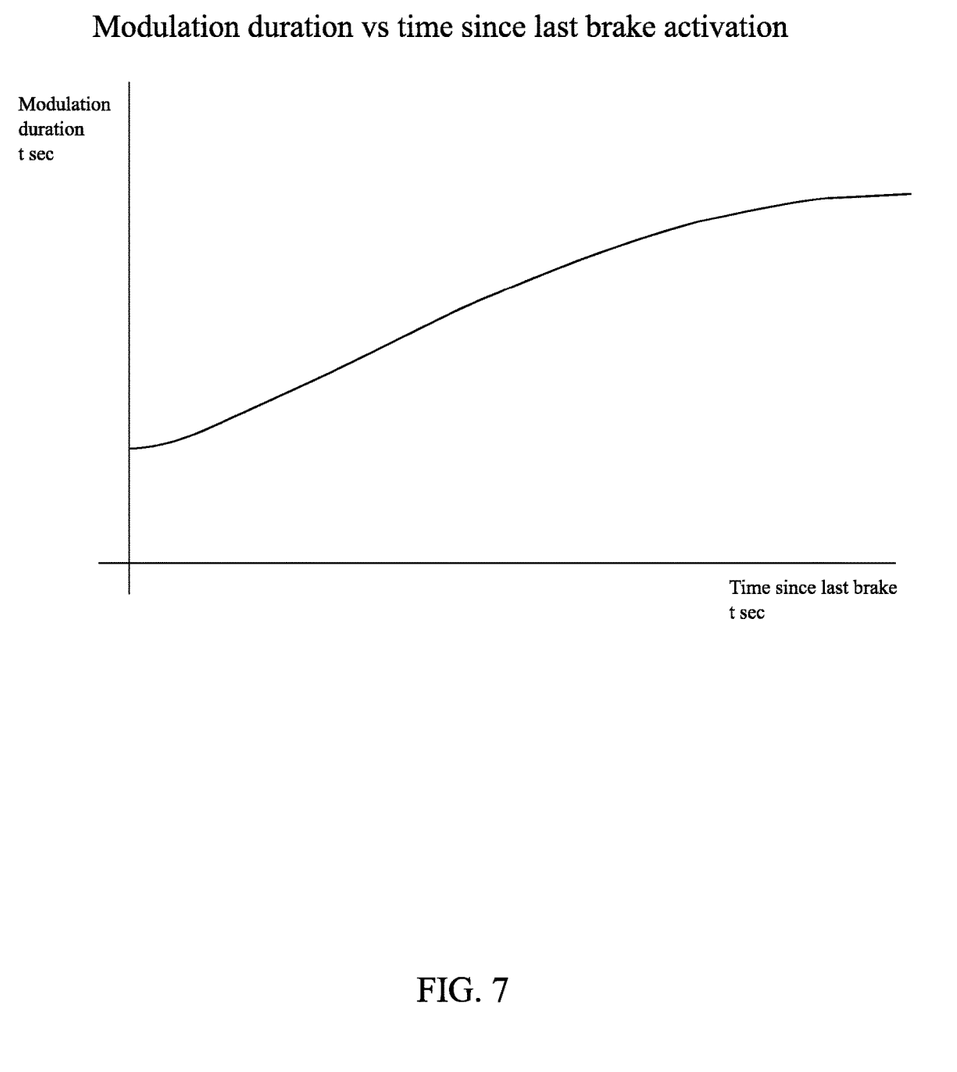
FIG. 7 is a graph showing the relationship between modulation duration and time since last brake activation in one embodiment of the present invention.
Figure 8:
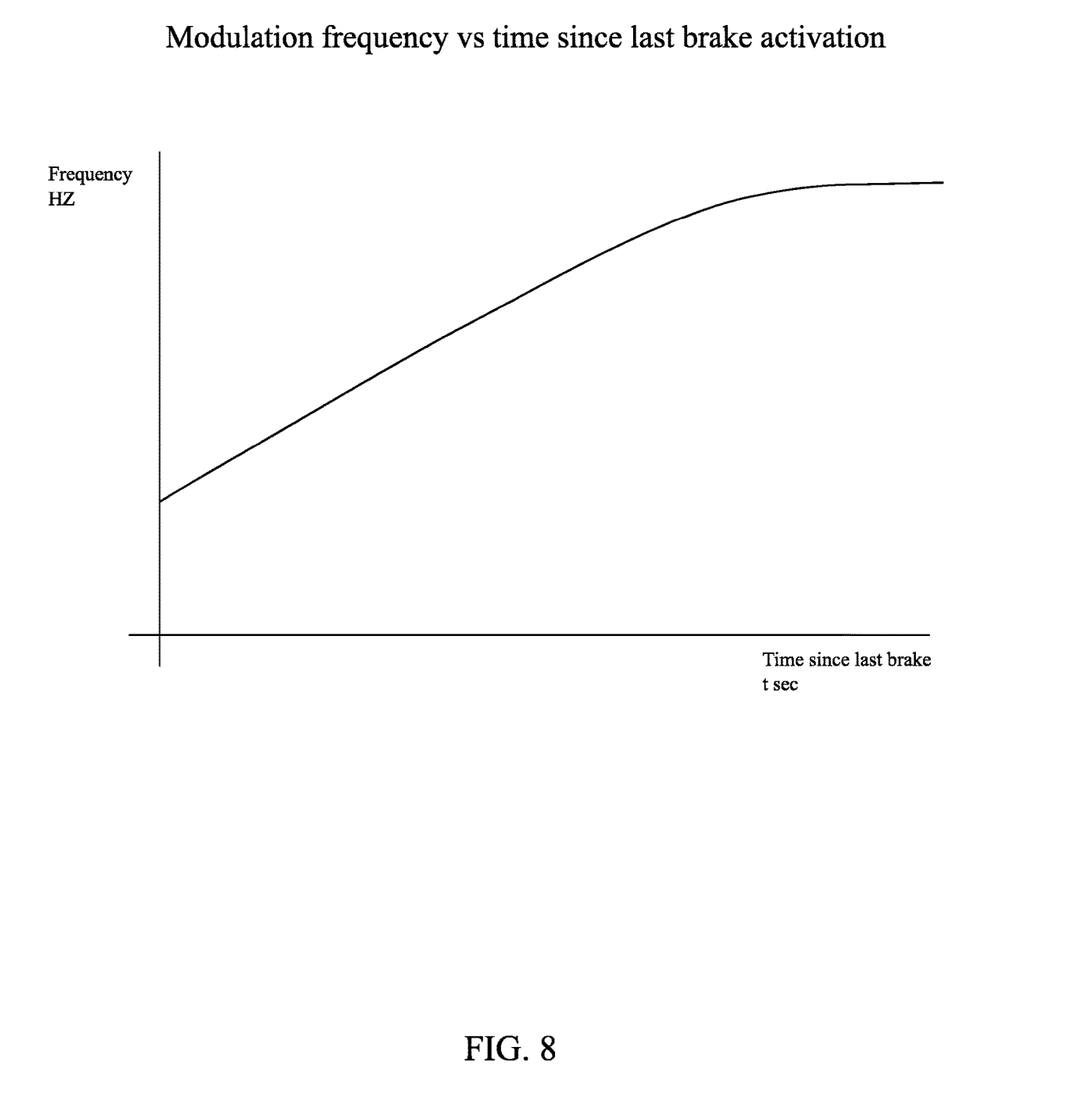
FIG. 8 is a graph showing the relationship between modulation frequency and time since last brake activation in one embodiment of the present invention.
Figure 9:
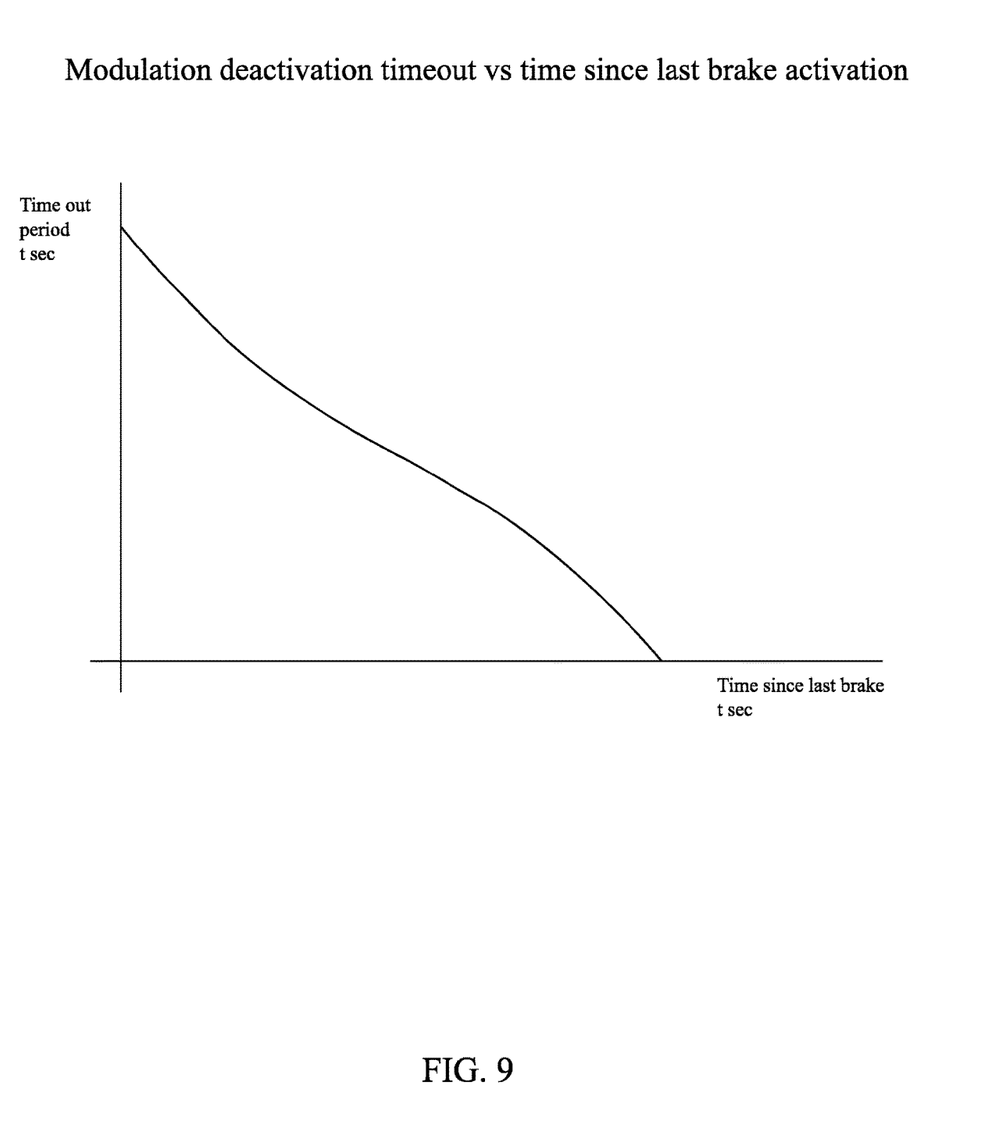
FIG. 9 is a graph showing the relationship between modulation deactivation timeout and time since last brake activation in one embodiment of the present invention.

In one embodiment, the duration of the modulation sequence may be adjusted in correlation with the time since the last brake activation, as shown in FIG. 7. In one embodiment, the modulation frequency may be adjusted in correlation with the time since the last brake activation, as shown in FIG. 8. In one embodiment, the timeout duration may be adjusted in correlation with the time since the last brake activation, as shown in FIG. 9.

A general overview and various specifics of one embodiment of the present invention follows hereinafter, and is not intended to limit the scope of the present invention.

To minimize possible annoyance of flashing brake lights the present invention contains logic to detect heavy brake usage and prevent from repetitive brake modulation. The invention contains a lockout time value which prevents subsequent brake modulation. When the operator engages the brake for the first time the brake light is modulated. Upon release of the brakes the flasher starts the lockout timer. If the timer expires before the brakes are engaged again then the light will be modulated on the subsequent use. If the timer did not expire then the light will not be modulated on the subsequent use of the brake and will come solid on as it would without flasher installed. Every subsequent brake engagement also adds an extra 5 seconds to the timeout period, making the timeout period longer and longer during frequent brake usage thus further minimizing the chance of brakes to be modulated in stop and go traffic. Another timer with a preset time of 60 seconds timeout is started every time the brakes are disengaged and resets upon brake engagement. Once it is allowed to expire (60 second consecutive run time) the lockout duration is reset to 0.

The design of the circuit in one embodiment of the present invention contains the power capacitor C which is charged during the initial brake operation through diode D. The power capacitor is sized appropriately that upon release of brakes and subsequent removal of power source to the circuit the microcontroller can continue its operation by consuming power accumulated in the capacitor. The microcontroller needs to operate for at least 60 seconds upon removal of the power source. Once the voltage from the capacitor drops to level below microcontroller supply threshold, microcontroller is stopped and all the dynamic values are reset. The subsequent brake operations charge the capacitor and the cycle repeats.

The ability of the designed system to adjust the frequency of the modulation presents a challenge when an end user selects a low frequency modulation normally allocated and used for the incandescent bulbs, for highly dynamic LED bulbs. During the modulation the light turns on and off, and with combination of low frequency and LED bulb the brake light could be perceived to be off for period of time which is not desired and could be illegal in some areas and jurisdictions. To resolve this issue, the present invention will provide the ability for the end user to configure a light minimum intensity which will be displayed during the light modulation off cycles, so the operation of the device could comply with local laws and regulations. The end user will be able to select the light to be completely turned off or have some level of intensity during the off phase of the cycle. The microcontroller used in the invention will contain dedicated, built-in PWM (power width modulation function) output. The PWM output is very common and provided by the industry leading microcontroller manufactures in many of their microcontroller line up offerings. The PWM output would be connected to the P type MOSFET to control the average power supplied in order to regulator low light intensity during the off phase of modulation cycle. By using already built-in PWM function from off the shelf the microcontroller requires no extra components, making the device economical and ability to be manufactured in with a small footprint. The above invention could be easily manufactured on less than 1 square inch of the PCB board and therefore fit in most automotive light housing.

Another benefit of the present invention is that user will be able to select number of light flashing cycles during the modulation. The user will have ability to configure the device, balancing the number of cycles and the rate of flashing to generate the desired length of modulation.

Another benefit of the invention is the user interface that will allow the end user to make critical adjustments like flashing rate, number of modulation cycles, intensity during modulation off time and other parameters. The user interface consists of a push button connected to the device. The push of the button is monitored by the device microcontroller and, when initiated for the first time, the device will go into the configuration mode. In the configuration mode the brake light will no longer be controlled by the brake pedal; instead, the microcontroller will be controlling the light as a feedback to the end user during the configuration sequence.

For example, the first push of the button puts the device in the configuration section of the program. A consecutive push of the button will increment the first parameter (number of flashes during the modulation). Once the internal parameter value has increase the microcontroller will provide feedback to the user by flashing the light corresponding to the current value. If the current value is six, then the light will flash six times. Consecutive short push of the button will increase the value to seven and light will light up 7 times, and so on. Once the user is satisfied with the set parameter the button will be pushed and held for a couple of seconds. The microcontroller detects the longer push and saves the changed parameter to the internal nonvolatile memory. The light would flash a set number of times, for example ten times to provide feedback to the user the parameter is saved. The microcontroller program would then retrieve next the parameter; for example, the flash rate, and modulate the light according to the retrieved value. A short push of the button by the user will increase the flash rate and the new flash rate will be then played to the user. Once user is satisfied with the changed flash rate the configuration can be stored by pushing and holding the button. The other parameters will be changed and saved in the same fashion. Once the configuration is completed the power from the unit will be removed.

Another benefit of the invention is the ability to prevent any error code generated by the vehicle monitoring system. Modern vehicles have number of sophisticated monitoring system to monitor a number of vehicle control systems, including lights. The system monitors the specific bulb circuit current consumption and if the current deviates from the specification either by dropping to a low threshold value or raising to a high threshold value the system would detect a bulb malfunction. A bulb malfunction could indicate a broken bulb where the current drops to zero, or a shorted bulb where the current consumption jumps by a significant amount. Referring to FIG. 2, during flashing operation, the microcontroller modulates transistor T1 by allowing current to flow through the bulb during the active phase of the modulating cycle and then by shutting the current flow down during the passive phase. The shutting of the current flow is what would cause the vehicle monitoring system to falsely detect a bulb out condition. The present invention contains an additional circuit consisting of transistor T2 and current load R. During the off phase of modulation, the microcontroller activates the transistor T2 allowing additional current to flow through the load resistor R and therefore produces enough current consumption to simulate a working bulb and 'fool' the vehicle monitoring system. The output to transistor T2 could be either constant on during transistor T1 off phase, or a modulated PWM signal so the average current consumption by load R could be adjusted to the required value.

Although the invention has been explained in relation to its preferred embodiment, it is to be understood that many other possible modifications and variations can be made without departing from the spirit and scope of the invention as hereinafter claimed.

What is claimed is:

1. A method of modulating a vehicle's brake light activation by executing computer-executable instructions stored on a non-transitory computer-readable medium comprises the steps of:
   providing a braking system operatively connected to a brake light;
   specifying a modulation sequence and a timeout duration;
   receiving an initial brake engagement signal through the braking system at a first time stamp;
   alternatingly activating and deactivating the brake light according to the modulation sequence while the initial brake engagement signal is received;
   deactivating the brake light at a second time stamp, if the initial brake engagement signal ceases to be received at the second time stamp;
   calculating a lockout termination time stamp by adding the timeout duration to the second time stamp;
   receiving a subsequent brake engagement signal through the braking system at a third time stamp;
   statically activating the brake light while the subsequent brake engagement signal is received, if the third time stamp occurs before the lockout termination time stamp; and
   alternatingly activating and deactivating the brake light according to the modulation sequence, if the third time stamp occurs after the lockout termination time stamp.

2. A method of modulating a vehicle's brake light activation by executing computer-executable instructions stored on a non-transitory computer-readable medium as claimed in claim 1 comprises the step of:
   adding a specified delay time to the lockout termination time stamp, if the subsequent brake engagement signal is received before the lockout termination time stamp.

3. A method of modulating a vehicle's brake light activation by executing computer-executable instructions stored on a non-transitory computer-readable medium as claimed in claim 1 comprises the steps of:
   continually recording a quantity of brake engagement signals received over a specified time period; and
   adding a specified delay time to the lockout termination time stamp, if the quantity of brake engagement signals received over the specified time period exceeds a specified brake engagement quantity.

4. A method of modulating a vehicle's brake light activation by executing computer-executable instructions stored on a non-transitory computer-readable medium as claimed in claim 1 comprises the steps of:
   providing an accelerometer;
   measuring a braking force through the accelerometer; and
   modifying the modulation sequence in correlation with the braking force.

5. A method of modulating a vehicle's brake light activation by executing computer-executable instructions stored on a non-transitory computer-readable medium as claimed in claim 4 comprises the step of:
   modifying the modulation sequence by increasing a modulation frequency of the modulation sequence in correlation to the braking force.

6. A method of modulating a vehicle's brake light activation by executing computer-executable instructions stored on a non-transitory computer-readable medium as claimed in claim 1 comprises the step of:
   receiving user input through a user interface in order to specify a modulation frequency and a modulation duration for the modulation sequence.

7. A method of modulating a vehicle's brake light activation by executing computer-executable instructions stored on a non-transitory computer-readable medium as claimed in claim 1 comprises the step of:
   receiving user input through a user interface in order to specify a modulation frequency and a flash quantity for the modulation sequence.

8. A method of modulating a vehicle's brake light activation by executing computer-executable instructions stored on a non-transitory computer-readable medium as claimed in claim 1 comprises the step of:
   receiving user input through a user interface in order to select a bulb-specific modulation sequence as the modulation sequence, wherein the bulb-specific modulation sequence corresponds to a specific light bulb type of the brake light.

9. A method of modulating a vehicle's brake light activation by executing computer-executable instructions stored on a non-transitory computer-readable medium as claimed in claim 1 comprises the step of:
   receiving user input through a user interface in order to specify a minimum bulb intensity for the brake light.

* * * * *